March 29, 1960  J. J. GLAUBER  2,930,952
VARIABLE VACUUM CAPACITOR
Filed June 12, 1958  2 Sheets-Sheet 1
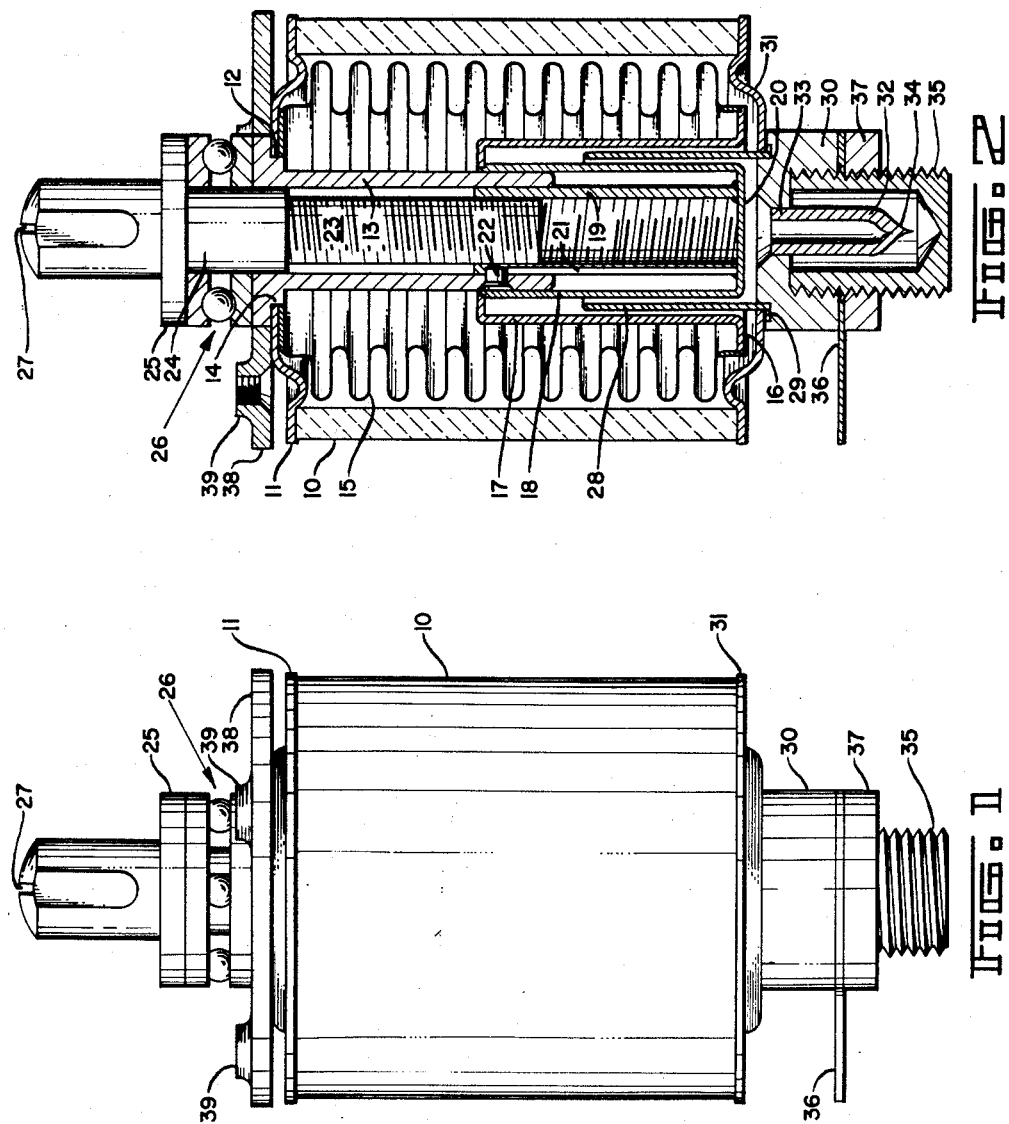
INVENTOR.
JOHN J. GLAUBER
BY
*Darby & Darby*
ATTORNEYS.

March 29, 1960
J. J. GLAUBER
2,930,952
VARIABLE VACUUM CAPACITOR
Filed June 12, 1958
2 Sheets-Sheet 2
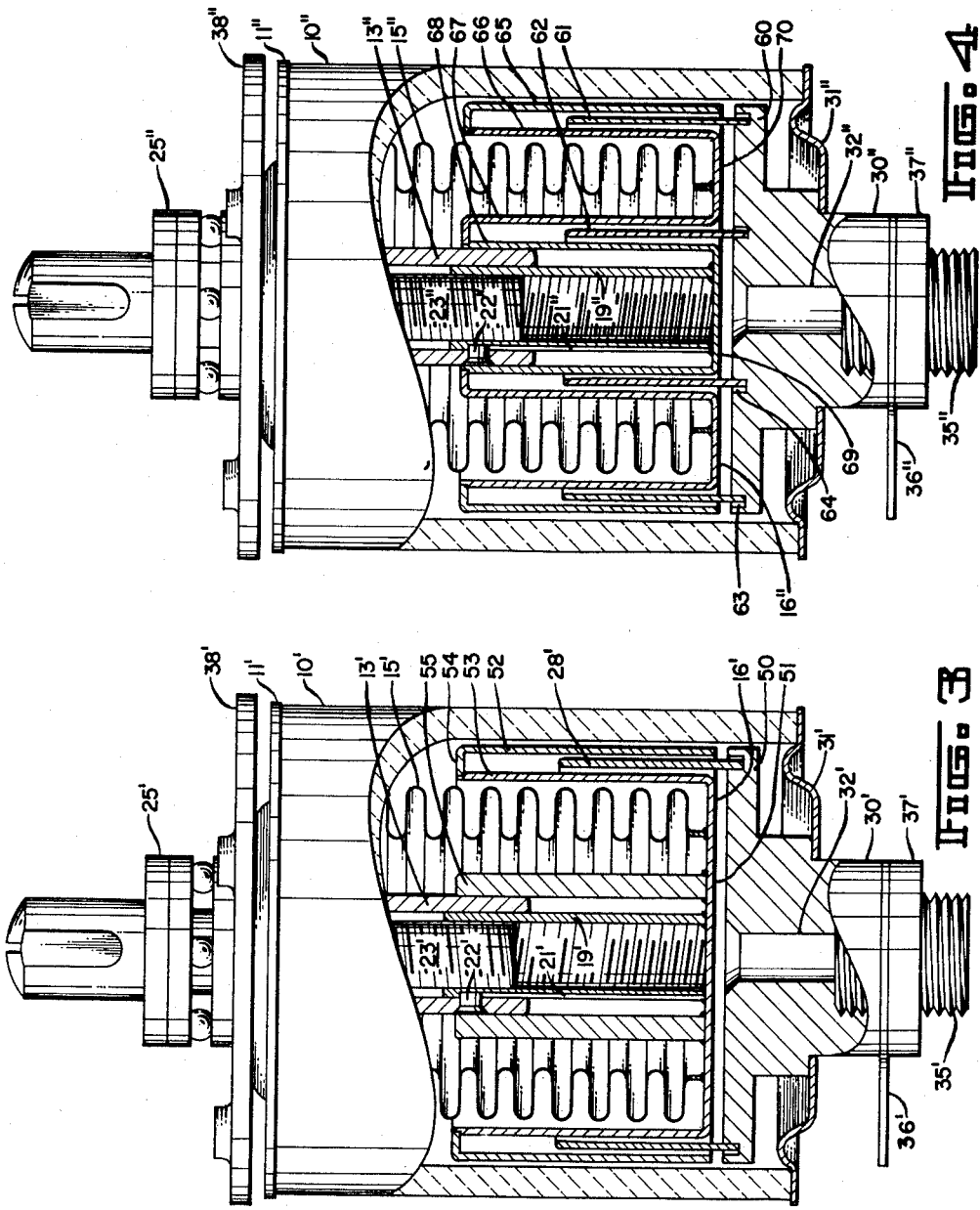
INVENTOR.
JOHN J. GLAUBER
BY
Darby + Darby
ATTORNEYS.

2,930,952

VARIABLE VACUUM CAPACITOR

John J. Glauber, Basking Ridge, N.J., assignor to United Electronics Company, Newark, N.J., a corporation of New Jersey Application June 12, 1958, Serial No. 741,510

8 Claims. (Cl. 317—245)

This invention relates to capacitors and more particularly to variable vacuum capacitors.

Variable vacuum capacitors are variable capacitors which employ a vacuum as the dielectric medium. Due to the fact that the vacuum within the capacitor envelope must be maintained at a substantially constant value, to avoid changes in capacitance for a given setting, the capacitor itself must be carefully fabricated with special attention being given to the sealing techniques employed. Furthermore, special motion transmitting devices, such as a bellows, must be utilized to adjust the setting of the capacitor without destroying the vacuum within the capacitor envelope. In addition, when the capacitance of the capacitor is varied by axially adjusting the electrode structures, it is necessary to provide adequate bearing structures to insure that lateral motion between the electrode structures does not vary the capacitance for a given axial setting. While means are presently available to secure all of the foregoing requirements, the resulting capacitor is usually large in size and relatively expensive to manufacture.

Accordingly, it is a primary object of this invention to provide a variable vacuum capacitor which meets the foregoing requirements and which possesses the advantages of small size and economy of manufacture.

Briefly, the variable vacuum capacitor of the invention makes use of a novel double bearing structure to insure lateral stability of the movable electrode structure during axial movement. A unique configuration of the movable electrode structure, in which the active portion of the electrode structure extends along the side of the bellows, is utilized to substantially reduce the axial length of the capacitor envelope. The capacitor of the invention also employs a pre-metallized ceramic housing and a novel arrangement of component parts to simplify the manufacture of the capacitor, without sacrificing accuracy of capacitance settings or reducing the overall ruggedness of the unit.

In the drawings:

Fig. 1 is an elevational view of a variable vacuum capacitor constituting a preferred embodiment of the invention;

Fig. 2 is a vertical sectional view of the capacitor of Fig. 1;

Fig. 3 is an elevational view, taken partly in vertical section, of a variable vacuum capacitor constituting an alternative embodiment of the invention; and Fig. 4 is an elevational view, taken partly in vertical section, of a variable vacuum capacitor constituting another embodiment of the invention.

Referring now to Figs. 1 and 2 of the drawing, there is shown a variable vacuum capacitor comprising a housing 10 of cylindrical shape. Housing 10 may be formed of a pre-metallized ceramic material or other suitable non-conducting material, such as glass, for example. A pre-metallized ceramic material is preferred however, because of the ease with which brazed connections may be made. Glass, for example, when heated to the high temperatures necessary for a brazing operation, becomes plastic, thereby necessitating the use of complicated and expensive holding fixtures. Since the ceramic material remains substantially rigid at the brazing temperature, very simple holding fixtures may be used to obtain accurate assemblies, thereby decreasing the manufactured cost of the capacitor. The use of ceramic material for the capacitor housing provides an additional benefit in the form of lower operating losses. Generally, glass is limited to operating temperatures of less than 450° C. because of its decreasing viscosity with increasing temperature. The loss factor in ceramics is quite low however, and does not increase with temperature until near the plastic temperature which, for 95% alumina, is about 1700° C.

A header plate 11 of Kovar, or other material having a suitable temperature coefficient of expansion, is brazed in a vacuum-tight assembly to one end of the ceramic housing 10. The header 11 has a centrally located aperture 12 in which a fixed bearing member 13 is inserted. The bearing member 13 has a raised shoulder portion 14 which is brazed to the header 11 in a vacuum-tight seal, so that the fixed bearing member is rigidly supported by the header and housing. A bellows 15 of copper, or other electrically conductive material, is brazed to the shoulder 14 and the header 11 in a vacuum-tight assembly. The free end of bellows 15 is brazed to the movable electrode structure 16 of the capacitor. The movable electrode structure 16 comprises an outer cylindrical shell 17 and an inner cylindrical shell 18 which are concentrically arranged to form the active portion of the electrode structure. It may be noted that both the inner and outer cylindrical shells of the electrode structure lie within the bellows structure itself and extend back from the free end of the bellows along the sides of the bellows, so that the axial length of the capacitor envelope is reduced. If desired, the movable electrode structure may be formed as an integral unit or may be formed of separate inner and outer cylindrical shells which are brazed together as illustrated. An internally threaded bushing 19 is brazed to the inactive portion 20 of the movable electrode structure. A longitudinally extending keyway 21 is formed in the bushing 19 and engages a pin 22 mounted in the fixed bearing member 13.

As thus far described, it will be seen that the movable electrode structure 16 is supported for axial movement along the fixed bearing member 13 by the inner cylindrical shell 18 and the bushing 19. Since the inner cylindrical shell 18 bears against the outer surface of member 13 and the bushing 19 bears against the inner surface of the member 13, a double bearing structure is effectively provided which permits the shortening of the overall capacitor length. This follows from the fact that the lateral stability of the movable electrode structure depends upon the length of the bearing surface provided for its support. In conventional types of capacitors, the main bearing surface must be of a reasonable length to provide the needed support, while in the described arrangement, the same length of bearing surface may be provided by a much shorter bearing structure.

In order to effect axial movement of the movable electrode structure, a threaded shaft 23 is inserted in the bearing member 13 in engagement with bushing 19, so that rotation of the shaft causes axial movement of the bushing 19 and consequently the movable electrode structure. The shaft 23 has a raised shoulder portion 24 which is rotatably supported by the bearing member 13. A collar 25 on the shaft engages a thrust bearing assembly, indicated generally as 26, to permit easy rotation of the shaft. Finally, a slot 27 is located in the external end of the shaft to permit adjustment of the angular position of the shaft to be made by a screwdriver or other means. The keyway 21 and the pin 22 cooperate to prevent rotational movement of the movable electrode structure upon rotation of shaft 23 and also serve as a limit stop for axial adjustment of the electrode structure.

The fixed electrode structure of the capacitor comprises a cylindrical shell 28 which is held in a recessed portion 29 of an end support 30. The end support 30 and the shell 28 are brazed in a vacuum-tight seal to another header plate 31 which, in turn, is brazed to the other end of capacitor housing 10. An exhaust tubulation 32 is brazed to an opening 33 formed in the end support 30, to permit evacuation of the air inside of the assembled capacitor. The exhaust tubulation 32 is pinched-off at 34 and is protected by an externally threaded cap member 35, which is screwed into the end support 30. A terminal lug 36 is placed over the end cap 35 and is held in place by a locking nut 37. If desired, a mounting plate 38 may be brazed to the header 11 to provide a means for mounting the capacitor unit and to provide an electrical connection point for the movable electrode structure. To this end, the mounting plate 38 is formed with a plurality of internally threaded bosses 39 which are adapted to receive mounting bolts or the like.

In operation, shaft 23 is rotated to vary the axial position of movable electrode structure 16 with respect to fixed electrode structure 28. Since the active portions of fixed electrode 28 and movable electrode 16 comprise concentric cylinders, axial movement between the electrodes varies the overlap or opposing surface area of the electrodes to thereby vary the capacitance of the unit. Due to the sealed bellows arrangement, a vacuum may be created between the bellows 15 and the housing 10 of the capacitor to form a vacuum dielectric medium between the fixed and movable electrodes. Since the adjusting shaft 23 and the bushing 19 are sealed within the bellows structure, variation in the axial position of the movable electrode structure may be accomplished without destroying the vacuum. Electrically, the fixed electrode 28 is connected directly to the terminal lug 36 by means of the end support 30, while the movable electrode 16 is connected by means of bellows 15 and the fixed bearing member 13 to the mounting plate 38, so that a voltage applied between the mounting plate 38 and the terminal lug 36 sets up an electrostatic field between the fixed and movable electrodes. Since the capacitor housing 10 is formed of electrically non-conductive material, the potentials applied to the fixed and movable electrodes are suitably insulated from each other. If desired, suitable indicating means may be provided on the mounting plate 38 and the adjusting shaft 23 to permit of an indication of the capacitance of the unit for a particular angular setting of the adjusting shaft.

Fig. 3 of the drawing shows an alternative embodiment of the invention in which the active portion of the movable electrode structure is arranged exteriorly of the bellows. In this figure, the same reference characters, but with a prime notation, will be employed for parts also utilized in the embodiment of Figs. 1 and 2. As seen in the drawing, the end support 30' is provided with an outwardly extending shoulder portion 50 which supports the cylindrical shell 28' of the fixed electrode structure. The movable electrode structure 16' has an extended inactive portion 51 which supports a pair of concentric cylindrical shells 52 and 53. As illustrated, cylinder 52 is curved inwardly at 54 to join with cylinder 53 in a vacuum-tight assembly. If desired, of course, the shells 52, 53 and the inactive portion 51 may be formed as an integral unit. In this embodiment of the invention, the cylinders of the movable electrode 16' are located exteriorly of the bellows 15' so that the inner cylinder 53 does not act as a part of the double bearing structure. Accordingly, a bearing cylinder 55 is arranged concentrically with the fixed bearing member 13' and is brazed at one end to the portion 51 of the movable electrode structure. As in the embodiment of Figs. 1 and 2, the bushing 19' is brazed to the portion 51, so that rotation of shaft 23' produces axial movement of the bushing and the movable electrode structure 16'. The remaining parts of the capacitor of Fig. 3 are the same as the capacitor of Figs. 1 and 2 and will not be described further.

Fig. 4 of the drawing shows an alternative embodiment of the invention in which the active portion of the movable electrode structure is located both inside and outside of the bellows, so that a greater capacitance may be obtained for a capacitor of given physical size. Again, the same reference characters, with double prime notations, will be employed for the same elements present both in the embodiment of Figs. 1 and 2 and the embodiment of Fig. 4. As seen in drawing, the end support member 30" is provided with an outwardly extending shoulder portion 60 which supports cylindrical shells 61 and 62 of the fixed electrode structure. The cylinders 61 and 62 are concentrically arranged about the major axis of the capacitor housing 10" and are respectively brazed in annular grooves 63 and 64 in the extended shoulder portion 60. The movable electrode structure 16" has an active portion consisting of concentric cylinders 65 and 66 located exteriorly of bellows 15" and concentric cylinders 67 and 68 located interiorly of the bellows. A circular bottom portion 69 and an annular bottom portion 70 join the respective concentric cylindrical shells of the movable electrode structure in a vacuum-tight assembly with the bellows 15". While the bottom portions and the cylindrical portions of the movable electrode structure may be fabricated separately and brazed together, it is also possible to form the movable electrode structure as an integral unit. In this embodiment of the invention, the innermost cylinder 68 provides one bearing surface with the fixed bearing member 13", while the bushing 19" forms the second bearing surface with the interior of member 13". Since the opposed surface area of the active portions of the electrode structures is increased in this arrangement, the capacity of the unit is proportionally increased, with but a small increase in overall physical size.

It is believed apparent that many changes could be made in the above construction and many apparently widely different embodiments of the invention made without departing from the scope thereof. For example, the active portions of the electrodes could take shapes other than cylindrical and materials other than those specified could be utilized. Accordingly, it is intended that all matter contained in the above description or shown in the accompanying drawings shall be interpreted as illustrative and not in a limiting sense.

What is claimed:

1. A variable vacuum capacitor comprising an evacuated envelope; a fixed electrode structure having an active portion mounted within said envelope at one end thereof; a bellows located within said envelope, said bellows having one end thereof sealed to the other end of said envelope; a movable electrode structure having active and inactive portions mounted on the free end of said bellows, the active portion of said movable electrode structure being parallel to the active portion of said fixed electrode structure and extending back from the free end of said bellows along the sides thereof, so that axial movement of the movable electrode structure produces a variation in the opposed surface area of the active portions of said electrode structures and a resulting variation in the capacitance of the capacitor, the inactive portion of said movable electrode structure being sealed to the free end of said bellows, so that the movable electrode structure and the bellows cooperate with said envelope to form a vacuum-tight enclosure for the active portions of said electrode structures; a double bearing structure for laterally supporting said movable electrode structure during axial movement thereof, said bearing structure including an elongated fixed bearing member mounted on said envelope within said bellows and having an opening extending longitudinally therethrough, to thereby form inner and outer bearing surfaces, a first movable bearing member having one end mounted on the inactive portion of said movable electrode structure and the other end in engagement with the inner bearing surface of said fixed bearing member, and a second movable bearing member formed by a part of said movable electrode structure in engagement with the outer bearing surface of said fixed bearing member; and means connected to said first movable bearing member for axially moving said movable electrode structure.

2. A variable vacuum capacitor as claimed in claim 1, wherein said first movable bearing member is an internally threaded bushing and said last-named means comprises a rotatable threaded shaft in engagement with said bushing.

3. A variable vacuum capacitor as claimed in claim 2, which further comprises a longitudinally extending keyway formed in said bushing and a pin mounted in said fixed bearing member in engagement with said keyway, to prevent rotational movement of said movable electrode structure out of said shaft.

4. A variable vacuum capacitor comprising an evacuated envelope; a fixed electrode structure having an active portion mounted within said envelope at one end thereof, said active portion comprising at least one cylindrical shell; a tubular bellows located within said envelope, said bellows having one end thereof sealed to the other end of said envelope; a movable electrode structure having active and inactive portions mounted on the free end of said bellows, the active portion of said movable electrode structure comprising at least one pair of cylindrical shells extending back from the free end of said bellows along the sides thereof, said pair of cylindrical shells being concentrically arranged with respect to said bellows and the cylindrical shell of said fixed electrode structure, with the shell of the fixed electrode structure disposed between the shells of the movable electrode structure, so that axial movement of the movable electrode structure produces a variation in the opposed surface area of the cylindrical shells of said electrode structures and a resulting variation in the capacitance of the capacitor, the inactive portion of said movable electrode structure being sealed to the free end of said bellows, so that the movable electrode structure and the bellows cooperate with said envelope to form a vacuum-tight enclosure for the active portions of said electrode structures; a double bearing structure for laterally supporting said movable electrode structure during axial movement thereof, said bearing structure including a fixed bearing sleeve having one end mounted on said envelope and the other end extending into said bellows, the inner and outer surfaces of said sleeve forming bearing surfaces, an internally threaded bushing having one end mounted on the inactive portion of said movable electrode structure and the other end in engagement with the inner bearing surface of said sleeve, and a cylindrical bearing member formed by a part of said movable electrode structure in engagement with the outer bearing surface of said sleeve; and a rotatable threaded shaft located within said sleeve in engagement with said bushing for axially moving said movable electrode structure.

5. A variable vacuum capacitor as claimed in claim 4, wherein said envelope comprises a tubular housing of premetallized ceramic material and a pair of end plates sealed to the ends of said housing.

6. A variable vacuum capacitor as claimed in claim 4, wherein said pair of cylindrical shells is disposed outside of said bellows and said cylindrical bearing member comprises a bearing cylinder on the inactive portion of said movable electrode.

7. A variable vacuum capacitor as claimed in claim 4, wherein said pair of cylindrical shells is disposed inside of said bellows and said cylindrical bearing member comprises the innermost shell of said pair of shells.

8. A variable vacuum capacitor as claimed in claim 4, wherein the active portion of said movable electrode structure comprises two pairs of cylindrical shells, one pair of said shells being disposed outside of said bellows and the other pair of said shells being disposed inside of said bellows, and wherein said cylindrical bearing member comprises the innermost shell of said pairs of shells.

References Cited in the file of this patent
UNITED STATES PATENTS
2,740,077   Clarke _____ Mar. 27, 1956